United States Patent
Arcand

(10) Patent No.: US 7,161,255 B2
(45) Date of Patent: Jan. 9, 2007

(54) ISOLATED GENERATOR EQUIPMENT COMPARTMENT

(75) Inventor: Sébastien Arcand, St-Augustin-de-desmaures (CA)

(73) Assignee: General Electric Canada, St-Augustin-de-desmaures (CA)

( * ) Notice: Subject to any disclaimer, the term of this patent is extended or adjusted under 35 U.S.C. 154(b) by 93 days.

(21) Appl. No.: 11/092,766

(22) Filed: Mar. 30, 2005

(65) Prior Publication Data

US 2006/0113795 A1 Jun. 1, 2006

(30) Foreign Application Priority Data

Nov. 30, 2004 (CA) .................................. 2488669

(51) Int. Cl.
*H02K 9/00* (2006.01)
(52) U.S. Cl. .............................. 290/1 B; 290/2; 310/52
(58) Field of Classification Search ................ 290/1 A, 290/1 B, 2; 322/100; 310/52, 59, 227
See application file for complete search history.

(56) References Cited

U.S. PATENT DOCUMENTS

| | | | | |
|---|---|---|---|---|
| 2,275,203 A | * | 3/1942 | Rudd | ........................ 174/43 |
| 2,548,566 A | * | 4/1951 | Stafford | ........................ 174/95 |
| 4,071,882 A | * | 1/1978 | Rehder | ........................ 361/602 |
| 4,621,211 A | * | 11/1986 | Spirk | ........................ 310/232 |
| 5,374,866 A | * | 12/1994 | Gill et al. | ...................... 310/59 |
| 5,783,932 A | | 7/1998 | Namba et al. | ................. 322/16 |
| 6,037,683 A | * | 3/2000 | Lulay et al. | ................... 310/52 |
| 6,465,926 B1 | * | 10/2002 | Rehder et al. | .............. 310/227 |

* cited by examiner

*Primary Examiner*—Nicholas Ponomarenko

(57) ABSTRACT

A power plant has a generator that is cooled by hydrogen gas. The power plant has a terminal compartment for housing stator terminals of the generator and conductor connections of a main bus taking electrical power away from the power plant. The power plant has a generator auxiliary equipment compartment that is distinct from the terminal compartment. The generator auxiliary equipment compartment receives tap connections that draw power from the main bus. The main bus comprises isolated phase bus duct, one for each phase. Electrically insulating sealing bushings are located in each phase of the isolated phase bus duct between the connections with the stator terminals and the tap connections to seal against the escape of hydrogen gas from the terminal compartment into the generator auxiliary equipment compartment.

11 Claims, 3 Drawing Sheets

ISOLATED GENERATOR EQUIPMENT COMPARTMENT

FIELD OF THE INVENTION

The present invention relates to a power plant and in particular to the layout of the generator and the auxiliary generator equipment at the power plant.

BACKGROUND OF THE INVENTION

Auxiliary generator equipment utilized in a power plant typically taps a local bus connected to instrument transformers so as to provide a mechanism to supply energy to the generator to re-start the generator in the event the generator has been shut down. Such generator auxiliary equipment typically comprises voltage transformers, current transformers, neutral grounding equipment, load commutated inverter three pole switches, circuit breakers, lightning arresters and capacitors. In the past, this generator auxiliary equipment has been packaged separately. The cost of packaging this equipment separately is expensive.

More recently terminal compartments, which house the generator terminals and leads from the generator terminals to the auxiliary equipment, have also been used house the generator auxiliary equipment. This reduces the costs associated with packaging the generator auxiliary equipment. However, because the generator bushings are usually cooled with hydrogen gas, accumulation of hydrogen gas in the terminal compartment can occur. Such accumulation of hydrogen gas becomes dangerous because if an arc were to occur in the terminal compartment due to phase to phase faults or switching, then it is possible an explosion could occur in the terminal compartment.

Accordingly, there is a need for the development of a layout for the generator terminals and auxiliary equipment that does not require separate packaging of the generator auxiliary equipment while at the same time reduces the possibility of hydrogen gas leaking from the terminal compartment. There is also a need to develop an isolated phase arrangement to prevent phase to phase fault for each of the phases of the generator auxiliary equipment.

BRIEF DESCRIPTION OF THE INVENTION

The present invention relates to a power plant that has a generator cooled by hydrogen gas. The power plant has a terminal compartment for housing stator terminals of the generator and conductor connections of a main bus taking electrical power away from the power plant. The power plant has a generator auxiliary equipment compartment that is distinct from the terminal compartment. The generator auxiliary equipment compartment receives tap connections that draw power from the main bus. The main bus comprises isolated phase bus duct, one for each phase. Electrically insulating sealing bushings are located in each phase of the isolated phase bus duct between the connections with the stator terminals and the tap connections to seal against the escape of hydrogen gas from the terminal compartment into the generator auxiliary equipment compartment.

Since the generator auxiliary equipment compartment is distinct from the terminal compartment and since the electrically insulating sealing bushing seal against the leakage of hydrogen gas along isolated phase bus duct of the main bus, escape of hydrogen gas into the generator auxiliary equipment compartment is prevented. Further, there are cost savings with packaging the generator auxiliary equipment in one compartment as opposed to separate compartments. It is also envisaged that the terminal compartment and the generator auxiliary equipment compartment may be positioned relative to each other either adjacent sharing a common dividing wall or separated by space.

In one embodiment, the electrically insulating sealing bushing is located where each first conductor passes out from the terminal compartment to seal against the travel of hydrogen gas out of the terminal compartment adjacent the first conductors.

In one embodiment there is provided a power plant comprising a generator cooled by hydrogen gas and comprising stator terminals, one for each phase. The power plant comprises a terminal compartment located adjacent the generator housing the stator terminals and a generator auxiliary equipment compartment distinct from the terminal compartment. The generator auxiliary equipment compartment houses generator auxiliary equipment. The power plant comprises a main bus extending from the terminal compartment. The main bus comprises isolated phase bus duct, one for each phase, each having a first conductor and an enclosure surrounding the first conductor extending outside of the terminal compartment. The first conductor is connected with a corresponding one of the stator terminals inside the terminal compartment. The power plant comprises first electrically insulating sealing bushing each one of which surrounds one of the first conductor within the enclosure of each isolated phase bus duct to seal against the escape of hydrogen gas from the terminal compartment along the isolated phase bus duct. The power plant comprises electrical tap connections, one for each phase, between the main bus and the generator auxiliary equipment for drawing electrical power from the main bus to the generator auxiliary equipment where the tap connections are positioned downstream of the first electrically insulating sealing bushings.

It is also envisaged that the generator comprises neutral terminals, one for each phase, are housed in the terminal compartment. The power plant comprises a neutral bus having three neutral conductors that extend into the terminal compartment for connection with a corresponding one of the neutral terminals. A second electrically insulating sealing bushing surrounds each neutral conductor where it passes out from the terminal compartment to seal against the travel of hydrogen gas out of the terminal compartment adjacent the neutral conductor. Such a seal is particularly advantageous when the generator auxiliary equipment compartment is positioned adjacent the terminal compartment and share a common dividing wall.

In another embodiment, the generator auxiliary equipment comprises lightning arresters and step-down transformers for each phase and the generator auxiliary equipment compartment comprises a metallic barrier extending between and segregating each phase of this auxiliary equipment. The use of the metallic barrier acts to prevent electrical fault between the phases.

In one embodiment, the terminal compartment is positioned on top of the generator.

In one embodiment the generator auxiliary equipment compartment is positioned adjacent the generator. In another embodiment, the generator auxiliary equipment compartment is positioned on top of the generator.

BRIEF DESCRIPTION OF THE DRAWINGS

For a better understanding of the nature and objects of the present invention reference may be had by way of example to the accompanying diagrammatic drawings in which.

DETAILED DESCRIPTION OF THE INVENTION

The present invention relates to a power plant and in particular to the layout of the generator and the auxiliary generator equipment at the power plant.

Figure 1:
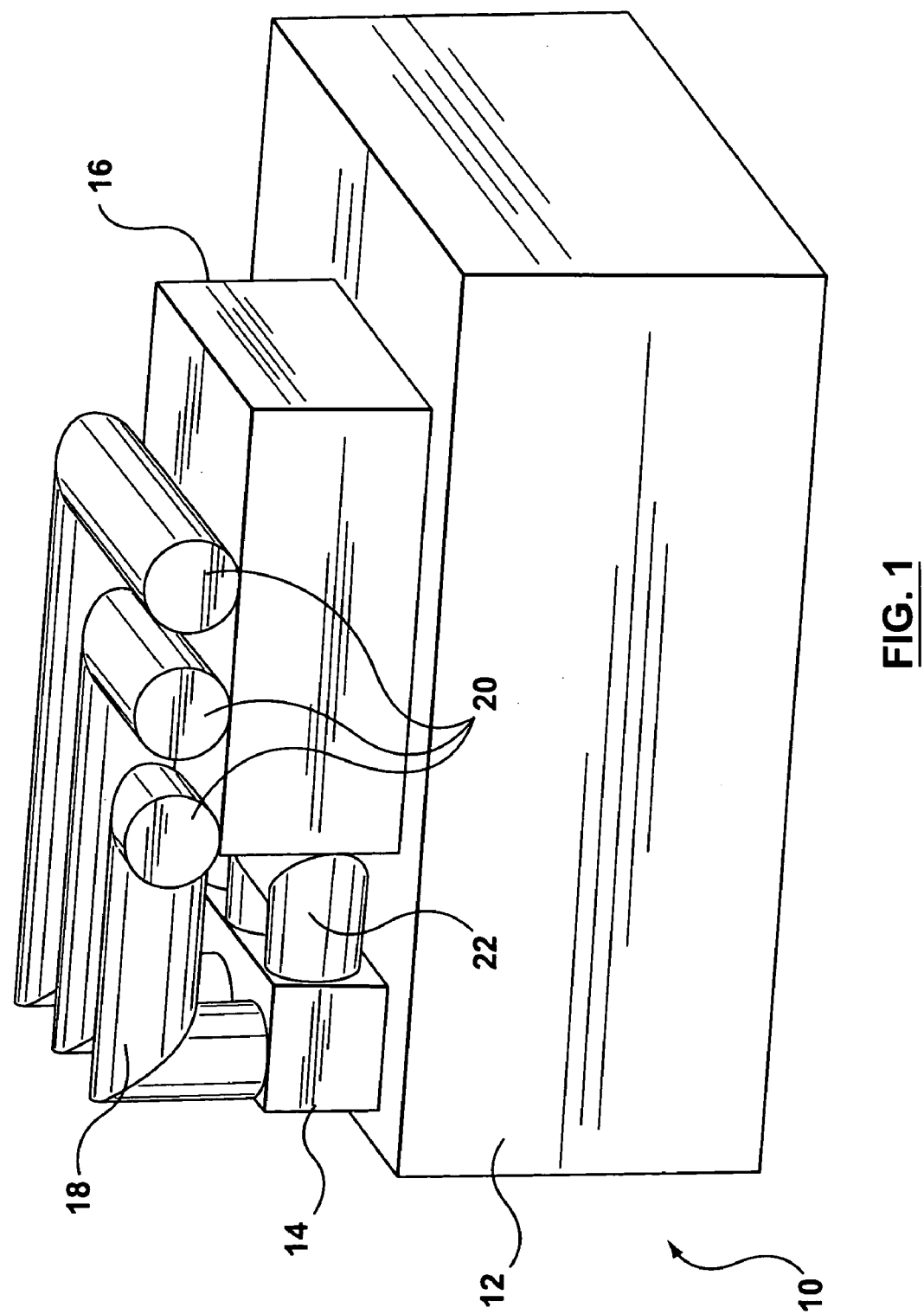
FIG. 1 is a perspective view of a power plant of the present invention.
Figure 2:
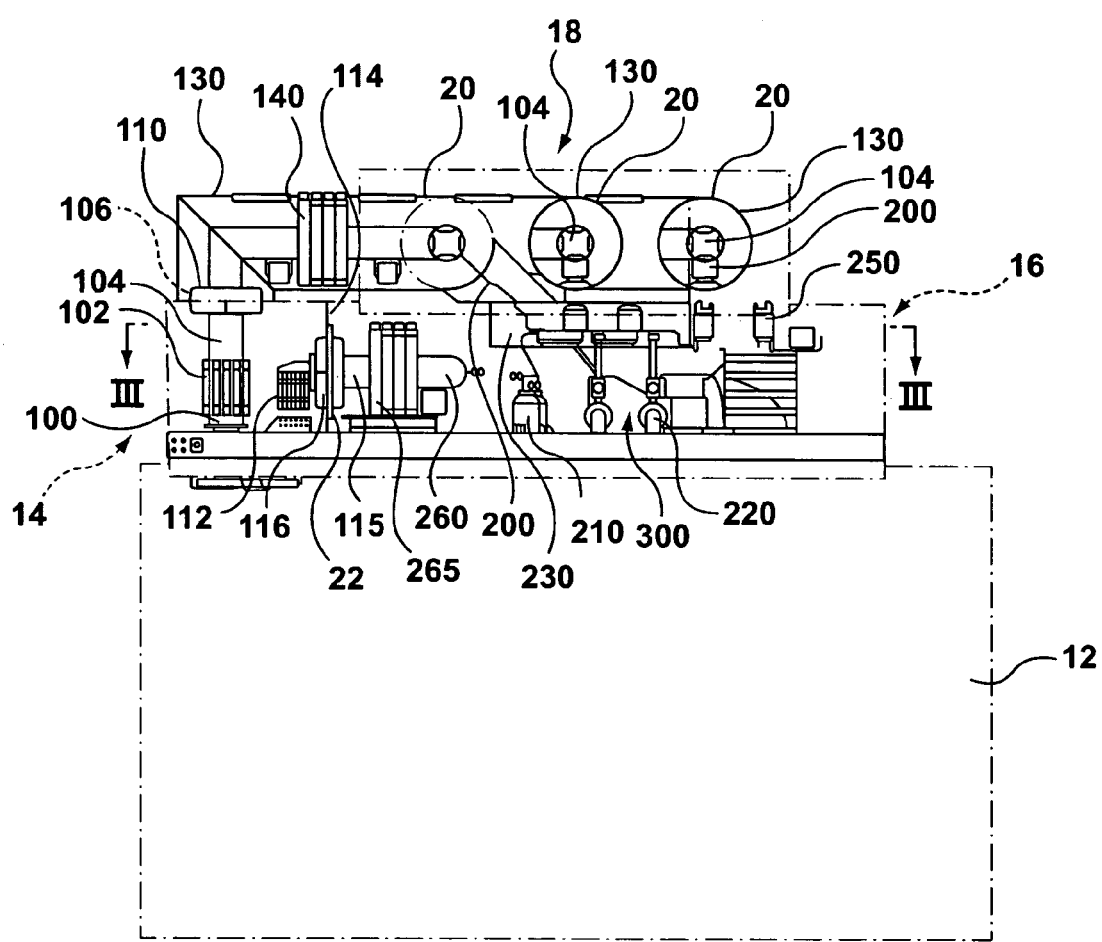
FIG. 2 is a sectional side view of the power plant.
Figure 3:
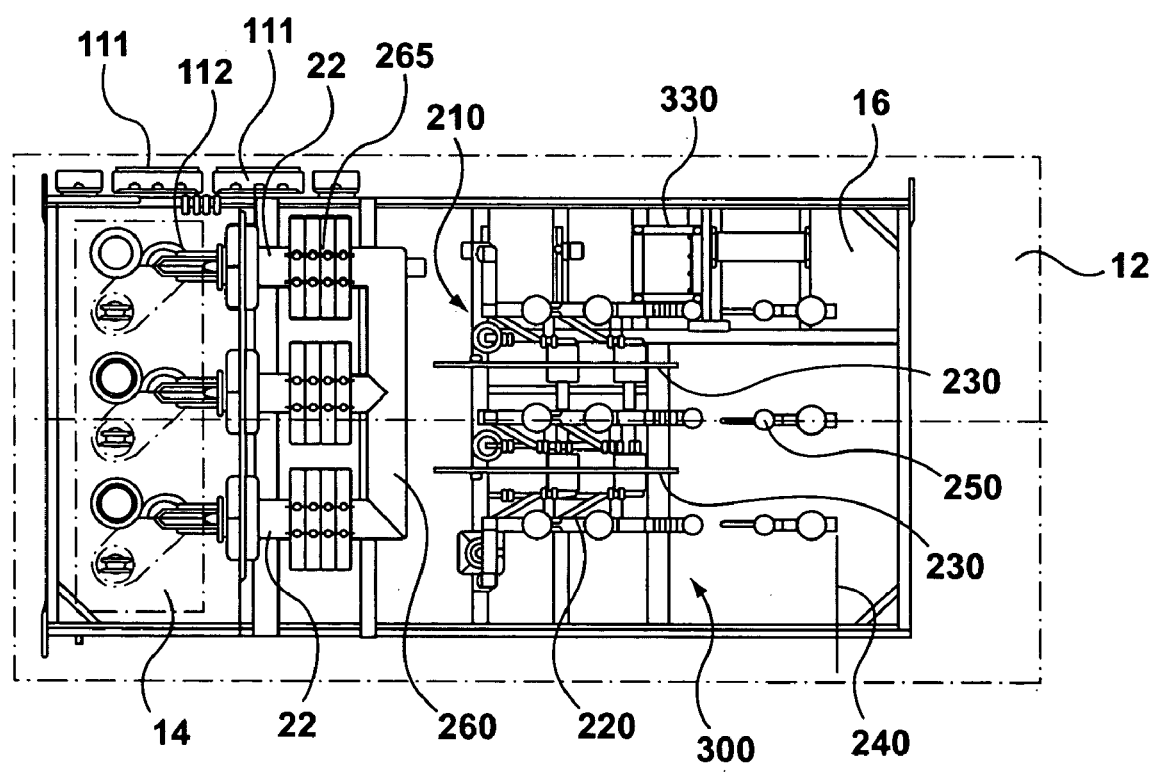
FIG. 3 is a plan view of the power plant taken along section line III—III of FIG. 2.

Referring to FIGS. 1 to 3, there is shown a power plant 10 having a generator 12. The generator 12 typically comprises a synchronous machine coupled to a motor driven by heat, steam, water or gas. In the present embodiment, the driving motor comprises a gas turbine.

Positioned on top of the generator 12 is a terminal compartment 14 from which connections with the stator of generator 12 are made for drawing electrical power from the generator 12. In FIG. 2, the terminal compartment 14 houses three stator terminals 100, one for each phase. Each of the stator terminals 100 is connected via finger like connectors 102 with an end portion of conductor 104. Conductors 104 pass through wall 106 of terminal compartment 14 and become part of the main bus 18. The generator bushings (not shown) are usually cooled by hydrogen gas which has the potential to leak into the terminal compartment 14. The conductors 104 are surrounded by electrical insulating and sealing bushings 110 which seals against hydrogen gas leaking out through wall 106 where conductor 110 exits the terminal compartment 14. Also connected within the terminal compartment 14 is a neutral bus having neutral conductor 112, one for each phase. The neutral conductors 112 are connected with the neutral 115 of each phase of the generator 12. The neutral conductors 112 pass through side wall 114 of the terminal compartment 14. Neutral conductors 112 are surrounded by an electrically insulating and sealing bushing 116 that seals against the escape of hydrogen gas through the side wall 114. The sealing bushings 110 and 116 have been placed adjacent the terminal compartment 14 or at a wall of the terminal compartment. It should be understood that these electrically insulating sealing bushings may be placed downstream in the bus duct away from the terminal compartment so long as the electrically insulating sealing bushings are located upstream of any tap from the main bus. However, the placement of the sealing bushings at the terminal compartment walls make is easy to install and service the sealing bushings.

As seen in FIG. 1, the main bus duct 18 passes over a generator auxiliary equipment compartment 16, makes a right angle turn and is shown to terminate. However, the termination of the main bus 18 in FIG. 1 is only illustrative. In practice the main bus 18 continues into the power plant or to another substation where the voltage of the mail bus 18 is stepped up by one or more step-up transformers for transmission of electrical power to the distribution system of a power grid. The main bus duct 18 comprises three isolated phase bus ducts. The isolated phase bus duct 20 each comprises one of the conductors 104 (FIG. 2) surrounded by a generally cylindrically shaped metal compartment 130. In the embodiment shown, the metal compartment 130 is made from aluminum. One such bus duct 20 is used for each phase of electrical current generated to thereby isolate the phases from each other and prevent discharges between the phases.

Referring to FIG. 2, each of the phases of the bus duct 20 has one or more current transformers 140 associated with it.

The conductor 104, that carries the current to be measured and controlled, passes through the window of the current transformer 140. The secondary winding is thus insulated from the high voltage and is connected to low voltage metering circuits. Control panels 111 (see FIG. 3) are mounted adjacent the terminal compartment and contain metering circuits, control switches and recorders that are used to control the power plant equipment.

The generator auxiliary equipment compartment 16 is positioned on top of the generator 12 and houses generator auxiliary equipment 300 (FIGS. 2 and 3) used to power the power plant and provide for re-starting of the power plant should the generator shut down. As seen in FIG. 2, power is fed into the generator auxiliary equipment compartment by taps 200, one for each phase.

The tap 200 of each phase is fed to a corresponding lightning arrester 210 of the generator auxiliary equipment 300. The lightning arrester 210 protects the other auxiliary equipment in the generator auxiliary equipment compartment 16 from damage by lightning discharge or other accidental electrical surge. The electricity tapped is then fed to step down transformers 220 of the auxiliary equipment 300 which step down the voltage of each phase for metering and protection.

Located between each phase in the generator auxiliary equipment compartment are metallic barriers 230 that isolate or segregate each phase and prevent electrical fault between phases.

Also housed in the a generator auxiliary equipment compartment 16 is a three pole load commutated inverter disconnect switch 250, connected to the leads 240, of the auxiliary equipment 300. As previously mentioned, the generator 12 comprises a synchronous generator coupled to the gas turbine in this embodiment. To re-start the generator, the switch 250 must be closed. so that the inverter provides electricity to the synchronous generator through the switch 250 when the generator 12 is shut down. This results in the synchronous generator being driven as a synchronous motor. The start up operation by this starter is continued until the gas turbine is able to sustain itself at speed by its combustion energy. Thereafter, the synchronous generator and the starter are isolated from the inverter 250 by opening of the circuit breakers or disconnect switch. At this time, the synchronous machine reverts to a generator.

Also located within the generator auxiliary equipment compartment 16 is the neutral bus 22 of the auxiliary equipment 300 shown as three bus connections that run into one rail 260. Each bus 22 has associated with it one or more current transformer 265 of the auxiliary equipment 300 to supply neutral bus information to the control panels 111. Neutral grounding equipment 330 is housed in the generator auxiliary equipment compartment 16 to provide a neutral ground connection for the power plant and generator.

It should be understood that while the terminal compartment 14 and is shown in the present embodiment placed on top of the generator 12, this compartment can be placed in any convenient location adjacent the generator 12. Further it should be understood that while the generator auxiliary equipment compartment 16 is shown in the present embodiment on top of the generator, this compartment may be placed in any convenient location at the power plant.

The present embodiment provides a layout for housing the generator terminals and the generator auxiliary equipment in distinct compartments isolated from each other by sealing bushings that prevent the escape of hydrogen gas from the terminal compartment into the auxiliary equipment compartment.

While the invention has been described in terms of various specific embodiments, those skilled in the art will recognize that the invention can be practiced with modifications within the spirit and scope of the claims.

What is claimed is:

1. A power plant comprising:
 a generator cooled by hydrogen gas and comprising stator terminals, one for each phase;
 a terminal compartment located adjacent the generator for housing the stator terminals;
 a generator auxiliary equipment compartment distinct from the stator terminal compartment, the generator auxiliary equipment compartment housing generator auxiliary equipment;
 a main bus extending from the terminal compartment, the main bus comprising isolated phase bus duct, one for each phase, each isolated phase bus duct having a first conductor and an enclosure surrounding the first conductor extending outside of the terminal compartment, the first conductor being connected with a corresponding one of the stator terminals inside the terminal compartment;
 first electrically insulating sealing bushings each one of which surrounds one of the first conductors within the enclosure of each isolated phase bus duct to seal against the escape of hydrogen gas from the terminal compartment along the isolated phase bus duct; and,
 electrical tap connections, one for each phase, between the main bus and the generator auxiliary equipment for drawing electrical power from the main bus to the generator auxiliary equipment, and the tap connections being positioned downstream of the first electrically insulating sealing bushings.

2. The power plant of claim 1 wherein the generator further comprises neutral terminals, one for each phase, housed in the terminal compartment, and wherein the power plant further comprises
 a neutral bus having three neutral conductors extending into the terminal compartment for connection with a corresponding one of the neutral terminals, and a second electrically insulating sealing bushing surrounding each neutral conductor where it passes out from the terminal compartment to seal against the travel of hydrogen gas out of the terminal compartment adjacent the neutral conductor.

3. The power plant of claim 1 wherein each of the first electrically insulating sealing bushing is located where the first conductor passes out from the terminal compartment to seal against the travel of hydrogen gas out of the terminal compartment adjacent the first conductors.

4. The power plant of claim 1 wherein the generator auxiliary equipment comprises lightning arresters and step-down transformers for each phase, and the generator auxiliary equipment compartment comprising a metallic barrier extending between and segregating each phase of the auxiliary equipment.

5. The power plant of claim 2 wherein the generator auxiliary equipment comprises lightning arresters and step-down transformers for each phase, and the generator auxiliary equipment compartment comprising a metallic barrier extending between and segregating each phase of the auxiliary equipment.

6. The power plant of claim 4 wherein the generator auxiliary equipment further comprises current transformers and disconnect switches.

7. The power plant of claim 5 wherein the generator auxiliary equipment further comprises current transformers and disconnect switches.

8. The power plant of claim 1 wherein the terminal compartment is positioned on top of the generator.

9. The power plant of claim 1 wherein the generator auxiliary compartment is positioned adjacent the generator.

10. The power plant of claim 9 wherein the generator auxiliary compartment is positioned on top of the generator.

11. The power plant of claim 2 wherein the terminal compartment and the generator auxiliary compartment share a common dividing wall through which the neutral bus passes from the terminal compartment into the generator auxiliary compartment.

* * * * *